US012101559B2

(12) United States Patent
Liu et al.

(10) Patent No.: US 12,101,559 B2
(45) Date of Patent: Sep. 24, 2024

(54) WAFER POSITION STATUS INSPECTION APPARATUS

(71) Applicant: JUN-FU TECHNOLOGY INC, New Taipei (TW)

(72) Inventors: Yu-Hsin Liu, New Taipei (TW); Cheng-Hsiang Lu, New Taipei (TW); Daisuke Sasaki, New Taipei (TW)

(73) Assignee: JUN-FU TECHNOLOGY INC, New Taipei (TW)

( * ) Notice: Subject to any disclaimer, the term of this patent is extended or adjusted under 35 U.S.C. 154(b) by 3 days.

(21) Appl. No.: 17/968,768

(22) Filed: Oct. 18, 2022

(65) Prior Publication Data

US 2024/0129632 A1 Apr. 18, 2024

(51) Int. Cl.
*H04N 23/695* (2023.01)
*B25J 19/02* (2006.01)
*G06T 1/00* (2006.01)
*G06T 7/00* (2017.01)
*H04N 23/54* (2023.01)
*H04N 23/56* (2023.01)

(52) U.S. Cl.
CPC .......... *H04N 23/695* (2023.01); *B25J 19/021* (2013.01); *G06T 1/0014* (2013.01); *G06T 7/0004* (2013.01); *H04N 23/54* (2023.01); *H04N 23/56* (2023.01); *G06T 2207/30148* (2013.01)

(58) Field of Classification Search
CPC ...... H04N 23/695; H04N 23/54; H04N 23/56; B25J 19/021; G06T 1/0014; G06T 7/0004; G06T 2207/30148
See application file for complete search history.

(56) References Cited

U.S. PATENT DOCUMENTS

| 2013/0169805 | A1* | 7/2013 | Park | H04N 7/18 348/143 |
| 2015/0288860 | A1* | 10/2015 | Chu | H04N 23/56 348/143 |
| 2018/0161984 | A1* | 6/2018 | Ishige | B25J 9/1697 |
| 2018/0304467 | A1* | 10/2018 | Matsuura | B25J 13/06 |
| 2018/0361589 | A1* | 12/2018 | Paquin | B25J 9/1697 |
| 2019/0073760 | A1* | 3/2019 | Wang | G06T 7/001 |
| 2021/0114223 | A1* | 4/2021 | Wee | H04N 23/54 |

* cited by examiner

*Primary Examiner* — Richard A Hansell, Jr.
(74) *Attorney, Agent, or Firm* — Leong C. Lei (57) ABSTRACT

A wafer position status inspection apparatus includes a wafer transportation device, a robotic arm rotatably mounted on the wafer transportation device, an image capture device arranged on the robotic arm, a light flashing device arranged at one side of the image capture device, and a status inspection section in information connection with the image capture device. An image capturing direction of the image capture device is set consistent with a gripping direction of the robotic arm, and a light projecting direction of the light flashing device is consistent with the image capturing direction. The light flashing device projects light on a wafer to generate a light-reflecting contour, which is captured by the image capture device to form a wafer contour image based on which the status inspection section acquires a wafer deposition status to identify various wafer statuses including incline, overlap, absence, and warp.

4 Claims, 13 Drawing Sheets

WAFER POSITION STATUS INSPECTION APPARATUS

TECHNICAL FIELD OF THE INVENTION

The present invention relates generally to a wafer position status inspection apparatus that features easy installation, low structure cost, and efficient inspection and is capable of detecting various statuses of a wafer, including incline, overlap, absence, and warp.

DESCRIPTION OF THE PRIOR ART

Wafers, after having been manufactured, are deposited in a cassette. Multiple partitions are arranged inside the cassette and each partition may carry and support one wafer so that the wafer is removable out of the cassette by a transportation means for subsequent operations, such as cutting and inspection.

However, before the wafer is removed, it is necessary to identify any occurrence of incorrect deposition of the wafer in the cassette, including absence, overlap, incline, and warp, in order to avoid damage of the wafer during the course of removal and deposition. Consequently, an inspection operation must be conducted on the wafers deposited in the cassette before the wafers of the entire cassette have not been removed, so that when incorrect deposition of a wafer has been identified, the operation of removal and deposition is suspended until a user relieves the error status.

Known measures for inspecting a deposition status of a wafer inside a cassette include inspection conducted by means of human inspection, infrared light, proximity sensors, complicated optical image recognition systems. For the optical image recognition systems, they often suffer poor matching efficiency due to complication of image contents recognized thereby, or simply because two light sources being required implementing inspection leads to a relatively high cost and necessity of simultaneously adjusting illumination angles of the two light sources, otherwise a result of recognition may be affected by shadows. Also, due to the system being complicated, the installation expenditure being high, or the size being bulky and adverse to spatial arrangement for the entire facility, there is still room for further improvement.

SUMMARY OF THE INVENTION

In view of the above, the present invention aims to provide a wafer position status inspection apparatus that features easy installation, low structure cost, and efficient inspection and is capable of detecting various statuses of a wafer, including incline, overlap, absence, and warp.

The primary objective of the present invention is that a robotic arm is provided with an image capture device and a light flashing device arranged thereon so as to simply uses a light-reflecting contour of a wafer as a basis for identifying if a deposition status of the wafer is abnormal, thereby realizing advantages of low cost, easy installation, and efficiency identification.

To achieve the above objective, the present invention provides a main structure that comprises: a wafer transportation device, a robotic arm, an image capture device, a light flashing device, and a status inspection section, wherein the robotic arm is rotatably mounted to the wafer transportation device; the image capture device is arranged on the robotic arm and has an image capturing direction that is consistent with a gripping direction of the robotic arm; the light flashing device is arranged at one side of the image capture device and has a light projecting direction that is consistent with the image capturing direction and, when put into operation, drives the image capture device to move, so that when light is projected onto a wafer, a light-reflecting contour is generated on the wafer to be captured by the image capture device captures as a wafer contour image; and the status inspection section is in information connection with the image capture device to identify a deposition status of the wafer according to the wafer contour image.

With the above structure, it only needs to arrange one image capture device and one light flashing device on the robotic arm of the wafer transportation device and to set the image capturing direction of the image capture device consistent with the gripping direction of the robotic arm and to have the light projecting direction of the light flashing device consistent with the image capturing direction, so that one single set of image capture device and light flashing device can be simply used for identification of the deposition status of a wafer. To conduct the operation of identification, light is projected onto the wafer so as to generate a light-reflecting contour on the wafer, and simultaneously, the image capture device is driven to capture a wafer contour image of the light-reflecting contour, and finally, the status inspection section identifies the deposition status of the wafer according to the wafer contour image. As such, various defect statuses of a wafer, including incline, overlap, absence, and warp can be quickly detected.

Based on the above technology, the drawbacks of poor comparison efficiency, high cost, multiple light sources being necessarily adjusted in synchronization with each other, and being bulky in size for the prior art way of inspecting a deposition status of a wafer in a cassette can be overcome, to thereby achieve the desired advantages discussed above.

DETAILED DESCRIPTION OF THE PREFERRED EMBODIMENT

Figure 1:
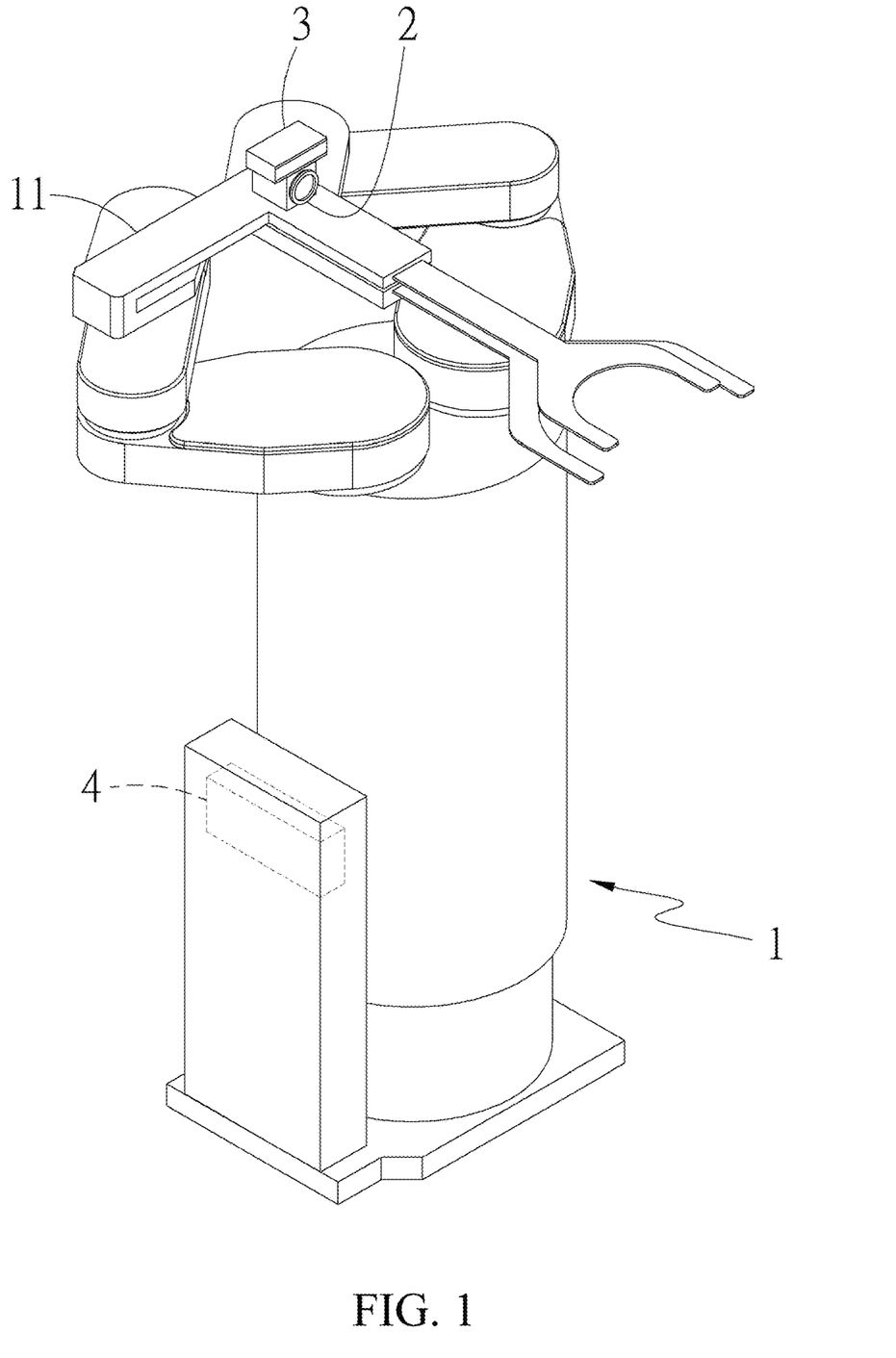
FIG. 1 is a stereoscopic perspective diagram of a first preferred embodiment of the present invention.

Referring to FIG. 1, which is a stereoscopic perspective diagram of a first preferred embodiment of the present invention, it is clearly seen from the drawing that the present invention comprises:

a wafer transportation device 1, of which an example taken in the instant embodiment is a wafer conveying machine (such as equipment front end module, EFEM);

a robotic arm 11, which is rotatably mounted on the wafer transportation device 1;

an image capture device 2, which is mounted on the robotic arm 11 and has an image capturing direction that is consistent with a gripping direction of the robotic arm 11, a camera being taken as an example in the instant embodiment;

a light flashing device 3, which is arranged at one side of the image capture device 2 and has a light projecting direction that is consistent with the image capturing direction and drives the image capture device 2 to move when put into operation, so that when light is projected onto a wafer, a light-reflecting contour is generated on the wafer and the image capture device 2 captures a wafer contour image, an infrared flash light being taken as an example of the light flashing device 3 in the instant embodiment; and a status inspection section 4, which is in information connection with the image capture device 2 to identify a deposition status of the wafer according to the wafer contour image, a processor arranged inside the wafer transportation device 1 being taken as an example in the instant embodiment and being illustrated with a phantom line block in the drawing.

Based on the above description, a structure of the technique of the invention is understood, and based on an assembly corresponding to such a structure, advantages of easy installation, relatively low structure cost, efficient inspection, and having advantages of detecting various statuses of the wafer, including incline, overlap, absence, and warp can be realized. A detailed explanation will be discussed below.

Referring simultaneously to FIGS. 1-5C, which are, respectively, a stereoscopic perspective diagram of a first preferred embodiment of the present invention, a use status diagram of the first preferred embodiment of the present invention, a schematic standard status diagram of the first preferred embodiment of the present invention, a schematic inspection diagram of the first preferred embodiment of the present invention, a first schematic abnormality status diagram of the first preferred embodiment of the present invention, a second schematic abnormality status diagram of the first preferred embodiment of the present invention, a third schematic abnormality status diagram of the first preferred embodiment of the present invention, and a fourth schematic abnormality status diagram of the first preferred embodiment of the present invention, it is clearly seen from the drawings that structurally, it is only necessary to mount an image capture device 2 on a robotic arm 11 of a wafer transportation device 1, and to arranged a light flashing device 3 on the image capture device 2, and then to have the image capture device 2 and the light flashing device 3 controlled by the wafer transportation device 1, and in installation, an image capturing direction of the image capture device 2 is set consistent with a gripping direction of the robotic arm 11, and a light projecting direction of the light flashing device 3 is set consistent with the image capturing direction, so that no matter what direction and what height-wise location that the robotic arm 11 is going to grip a wafer 9, the image capture device 2 and the light flashing device 3 are always move and oscillate in synchronization with the robotic arm 11, and as such, simply a single group of the image capture device 2 and the light flashing device 3 can be used to identify a deposition status of the wafer 9.

Figure 2:
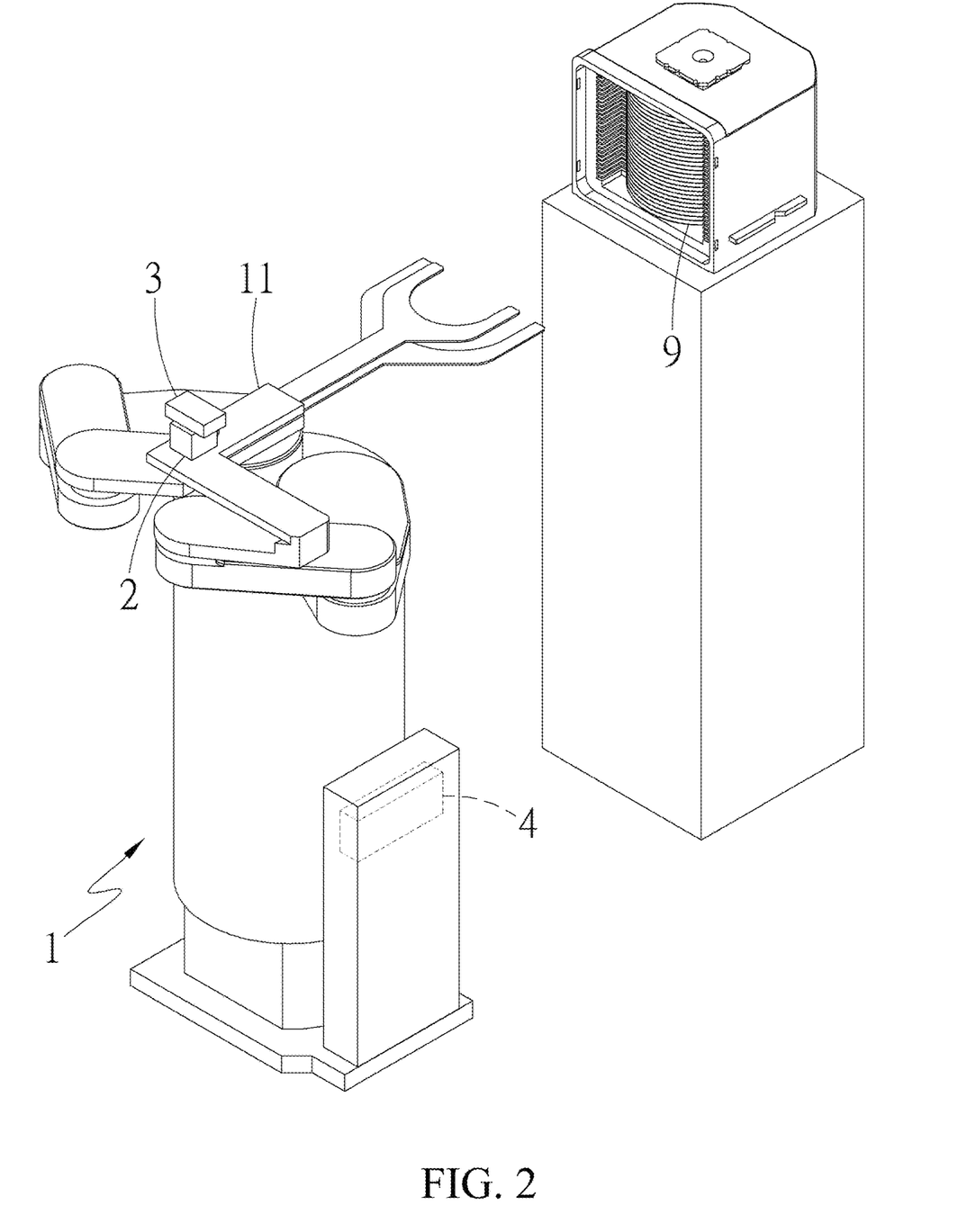
FIG. 2 is a use status diagram of the first preferred embodiment of the present invention.
Figure 3:
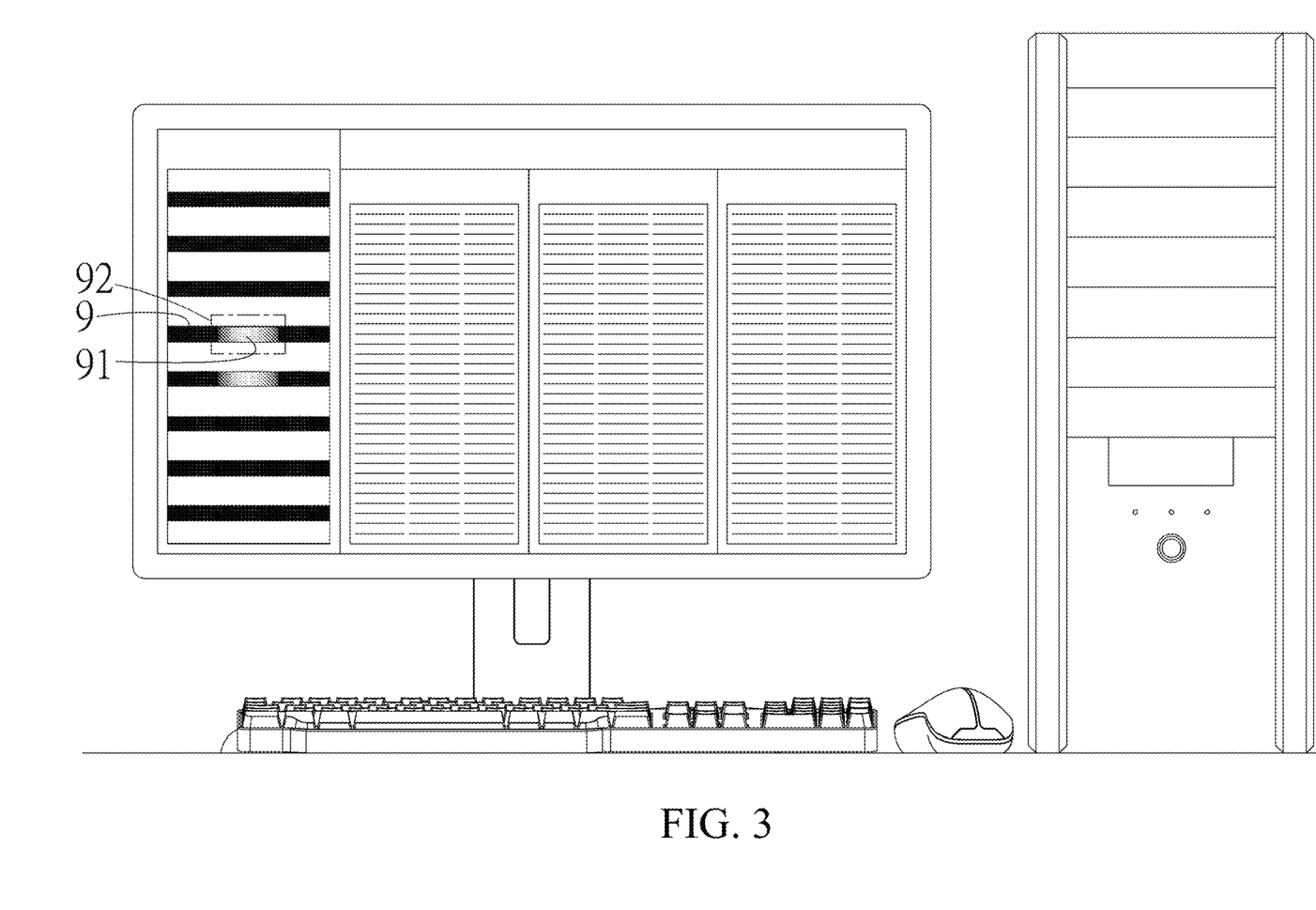
FIG. 3 is a schematic standard status diagram of the first preferred embodiment of the present invention.
Figure 4:
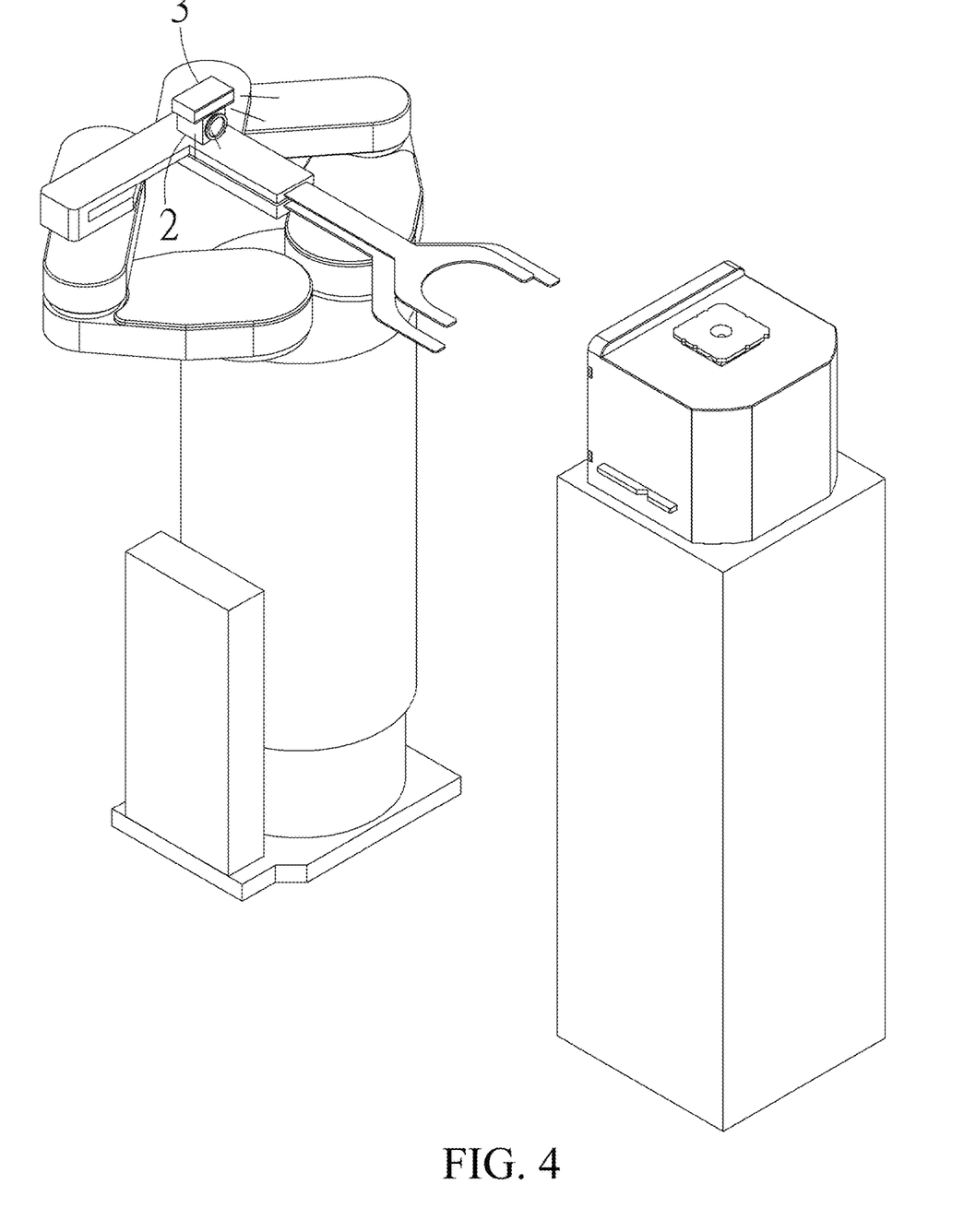
FIG. 4 is a schematic inspection diagram of the first preferred embodiment of the present invention.

As shown in FIGS. 2 and 3, in an actual operation, before the robotic arm 11 is actually put into operation for gripping, recognition is first conducted by preparing multiple ones of wafer 9 that are properly deposited and identified to involve no abnormal deposition status, in order to provide comparison data of a standard deposition status to the status inspection section 4. The operation of recognition is such that light is projected onto the wafer 9 to generate a light-reflecting contour 91 on the wafer 9, and the image capture device 2 is simultaneously driven to capture an image of the light-reflecting contour 91, wherein a left-hand side portion of a screen is a capturing range of the image capture device 2, and a light-reflecting contour 91 is generated on a front edge of the wafer 9 that is located in a light projection range of the light flashing device 3, and the image capture device 2 is operable to carry out image capturing for the light-reflecting contour 91 to generate a wafer contour image 92 (as shown in the phantom line block), and finally, the status inspection section 4 determines a deposition status of the wafer 9 according to the comparison data of the wafer contour image 92 compared with the standard deposition status.

Figure 5:
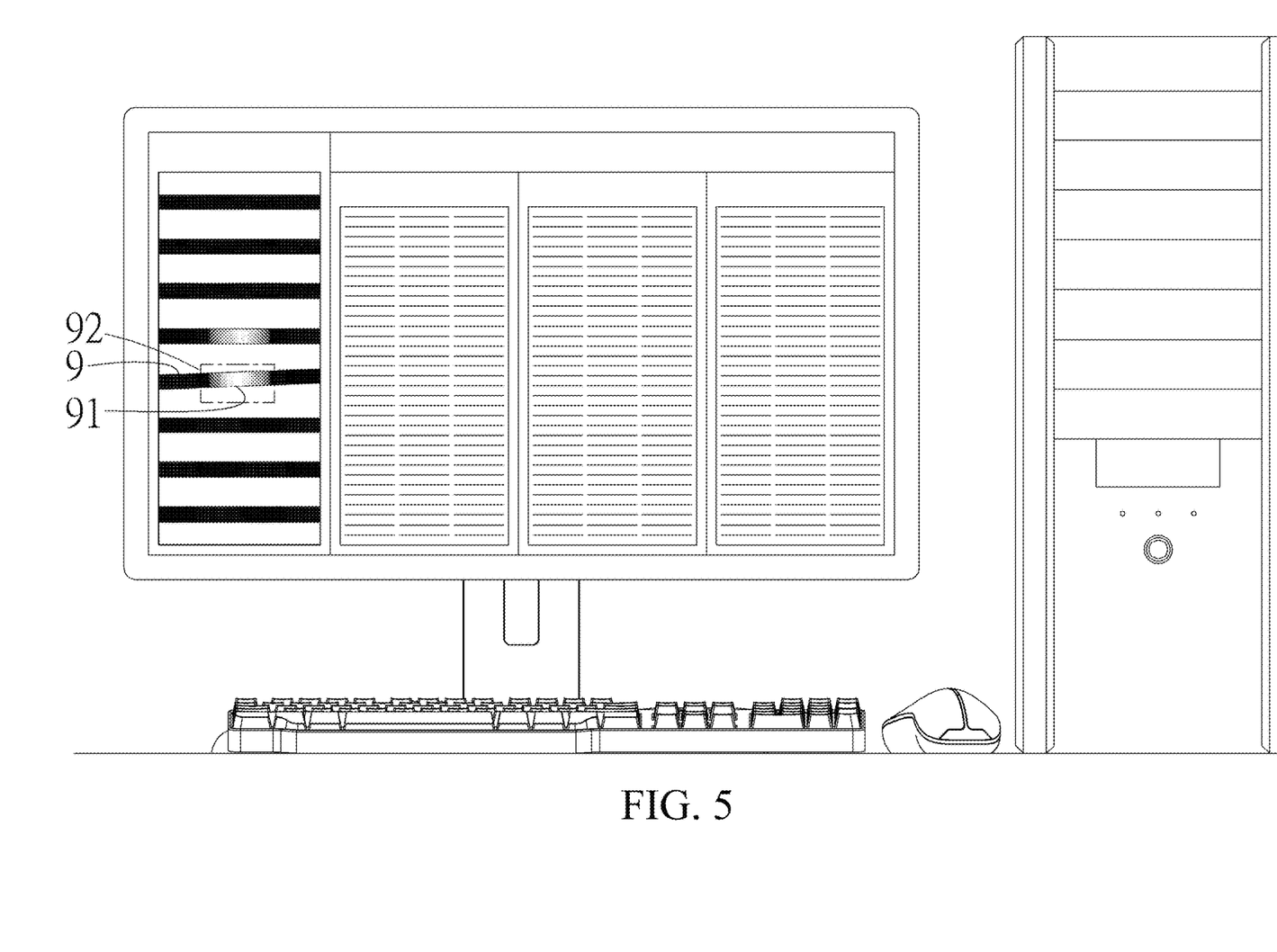
FIG. 5 is a first schematic abnormality status diagram of the first preferred embodiment of the present invention.
Figure 5A:
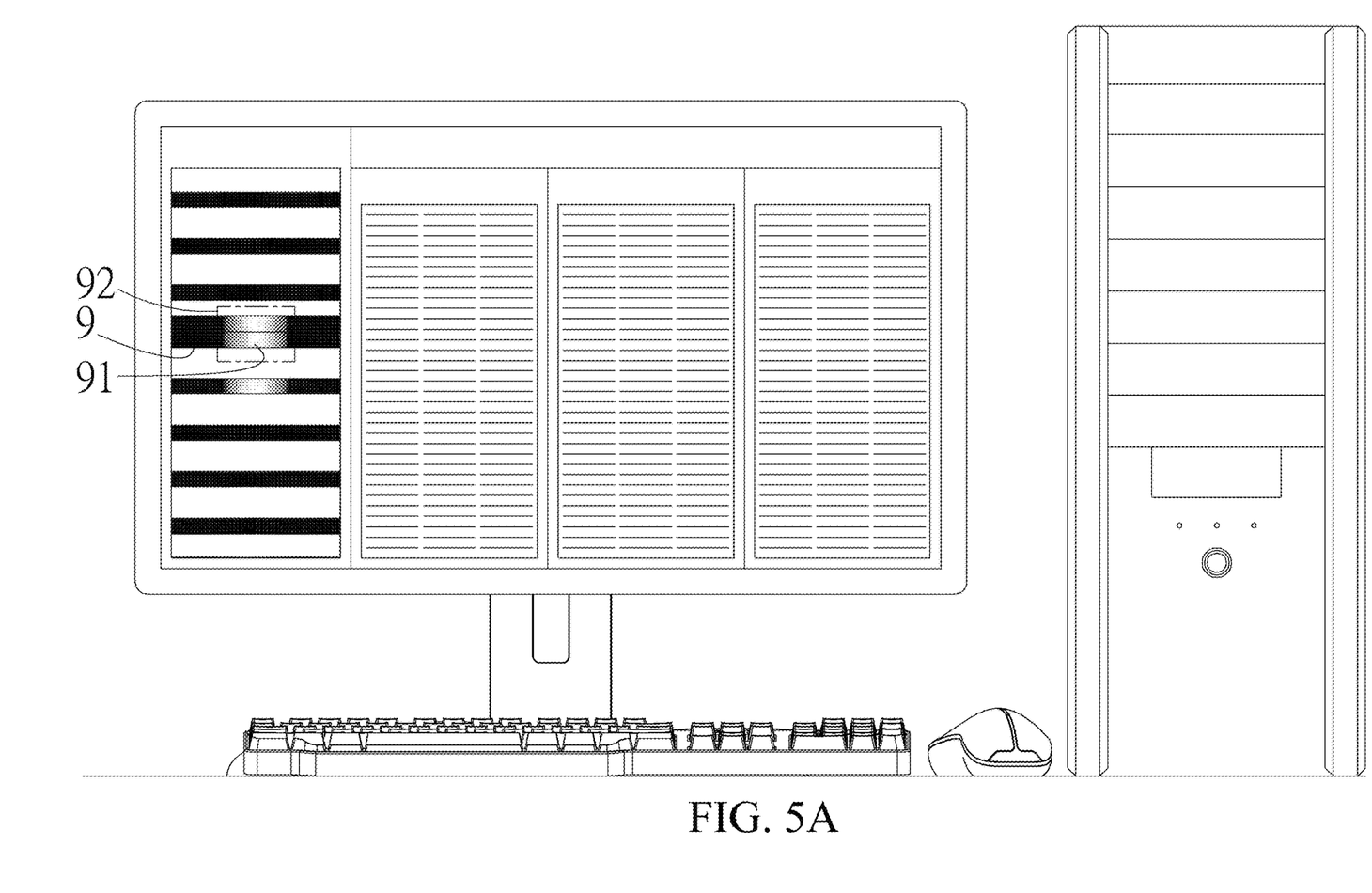
FIG. 5A is a second schematic abnormality status diagram of the first preferred embodiment of the present invention.
Figure 5B:
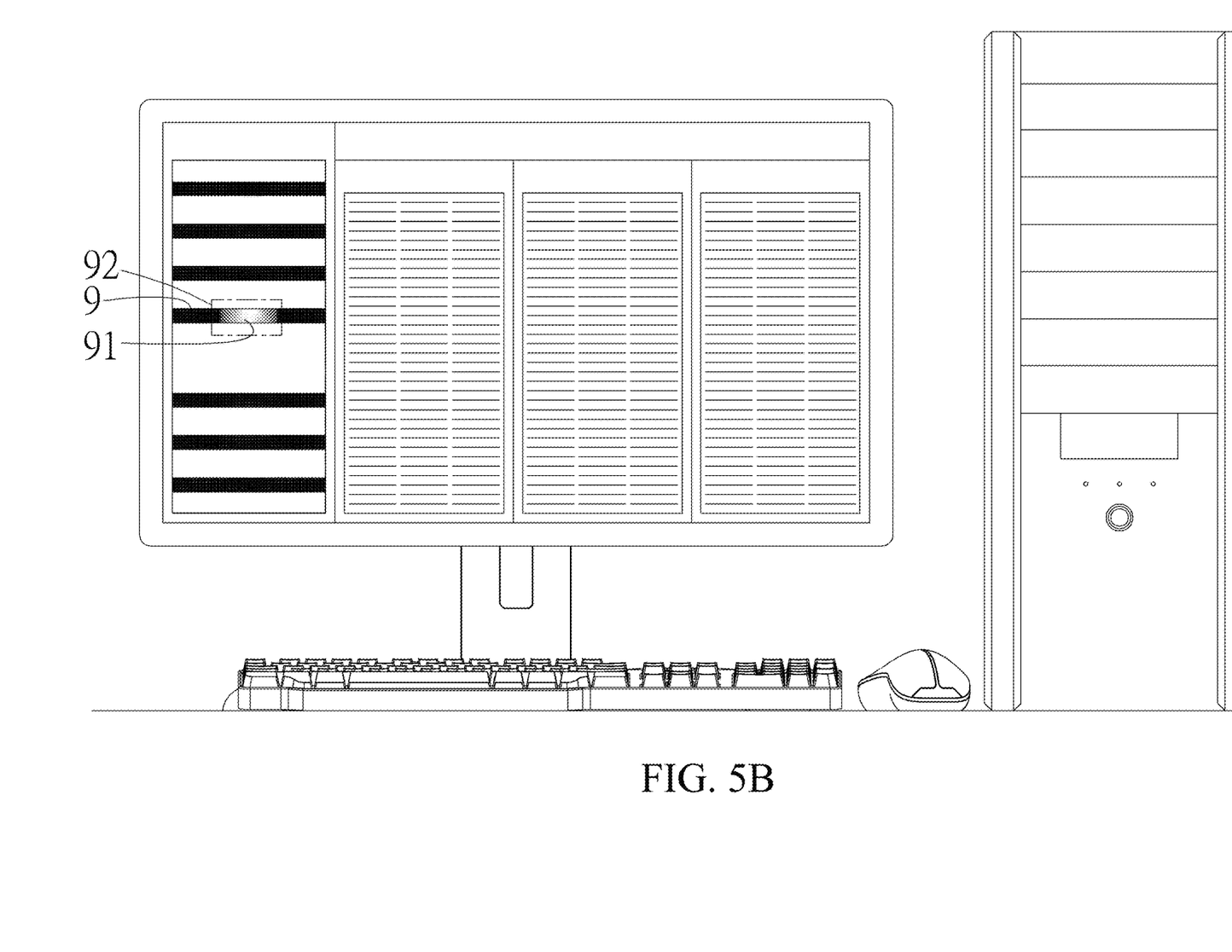
FIG. 5B is a third schematic abnormality status diagram of the first preferred embodiment of the present invention.
Figure 5C:
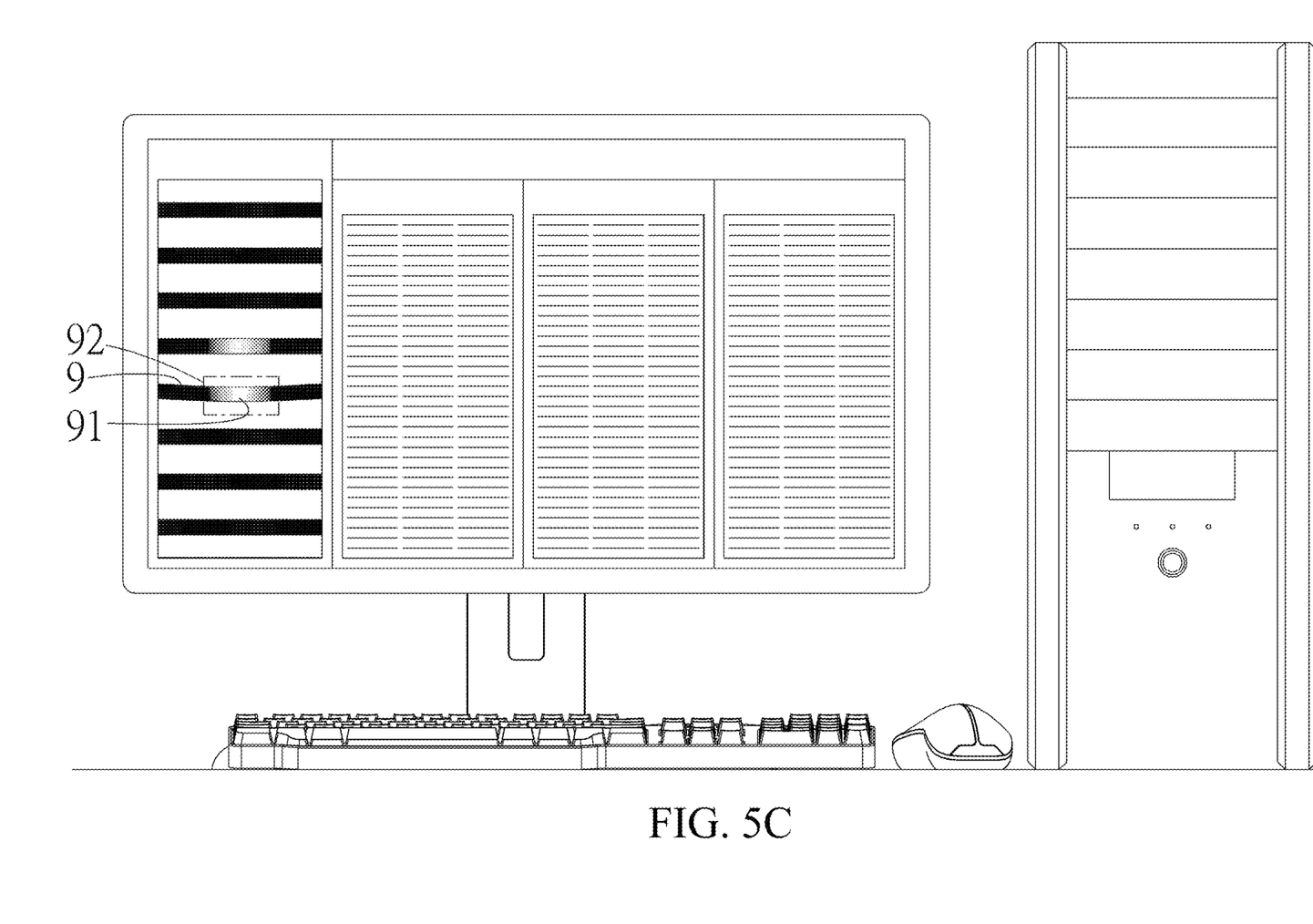
FIG. 5C is a fourth schematic abnormality status diagram of the first preferred embodiment of the present invention.

Thus, no matter what deposition status is a wafer 9, it is possible to efficiently identify various statuses of the wafer 9, including absence, incline, overlap, and warp. Among the drawings, FIG. 3 is a schematic diagram illustrating a standard deposition status; FIG. 5 is a schematic diagram illustrating an incline deposition status; FIG. 5A is a schematic diagram illustrating an overlap deposition status; FIG. 5B is a schematic diagram illustrating an absence deposition status; and FIG. 5C is a schematic diagram illustrating a warp deposition status.

Figure 6:
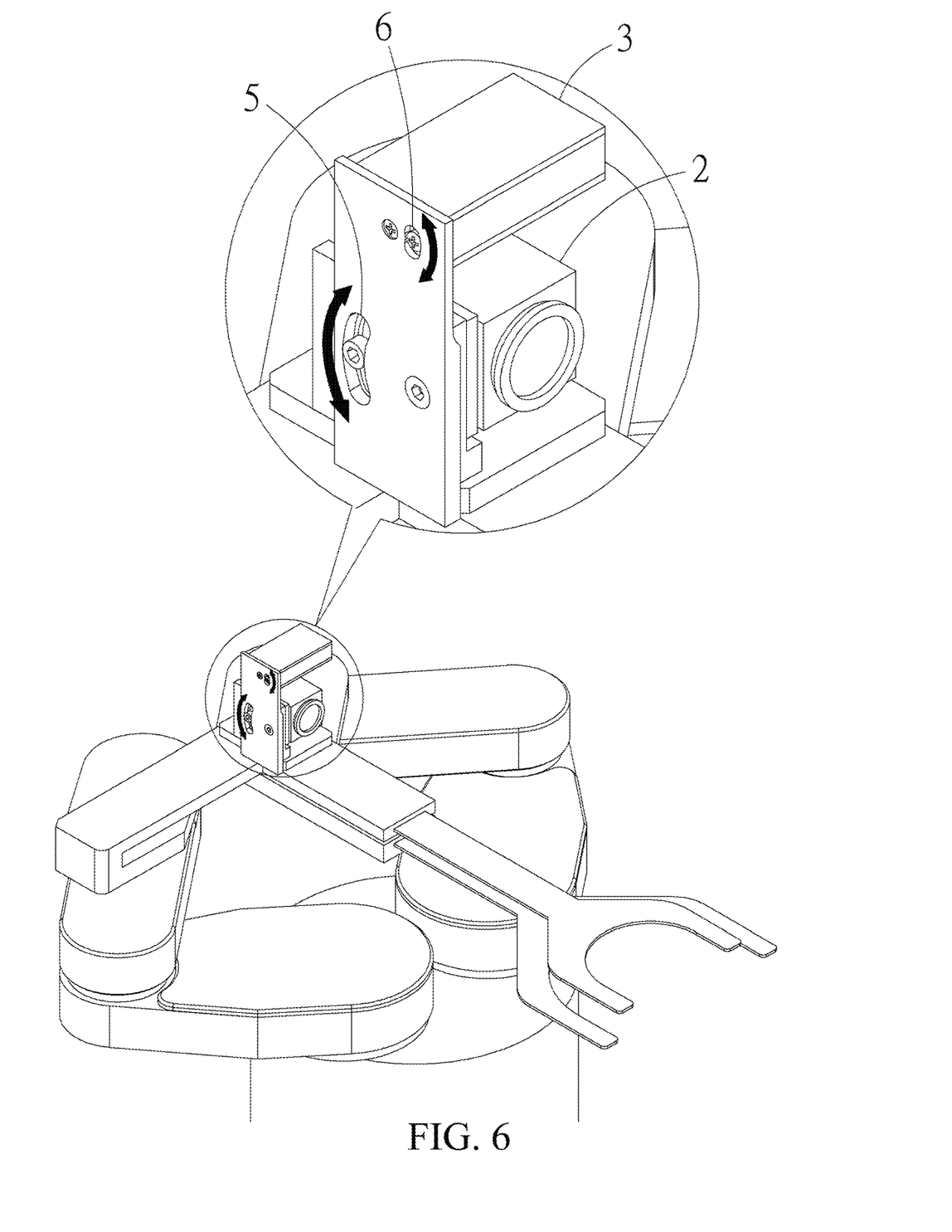
FIG. 6 is a schematic implementation diagram of a second preferred embodiment of the present invention.

Further referring to FIG. 6, which is a schematic implementation diagram of a second preferred embodiment of the present invention, it is clearly seen from the drawing that the instant embodiment, which is generally similar to the previous embodiment, features that at least one first angle adjusting member 5 is arranged on the image capture device 2 and at least one second angle adjusting member 6 is arranged on the light flashing device 3. In the instant embodiment, the first angle adjusting member 5 and the second angle adjusting member 6 are mounted to a metal plate, and are each in the form of a hollow arc track, which enables free adjustment of angular positions of the image capture device 2 and the light flashing device 3 by means of bolts, and since there needs just one set of light flashing device 3 in the present invention, the operation of angular adjustment is extremely easy, without any need to be in synchronization with other light sources, and also without any concern about recognition accuracy being affected by shadows.

Figure 7:
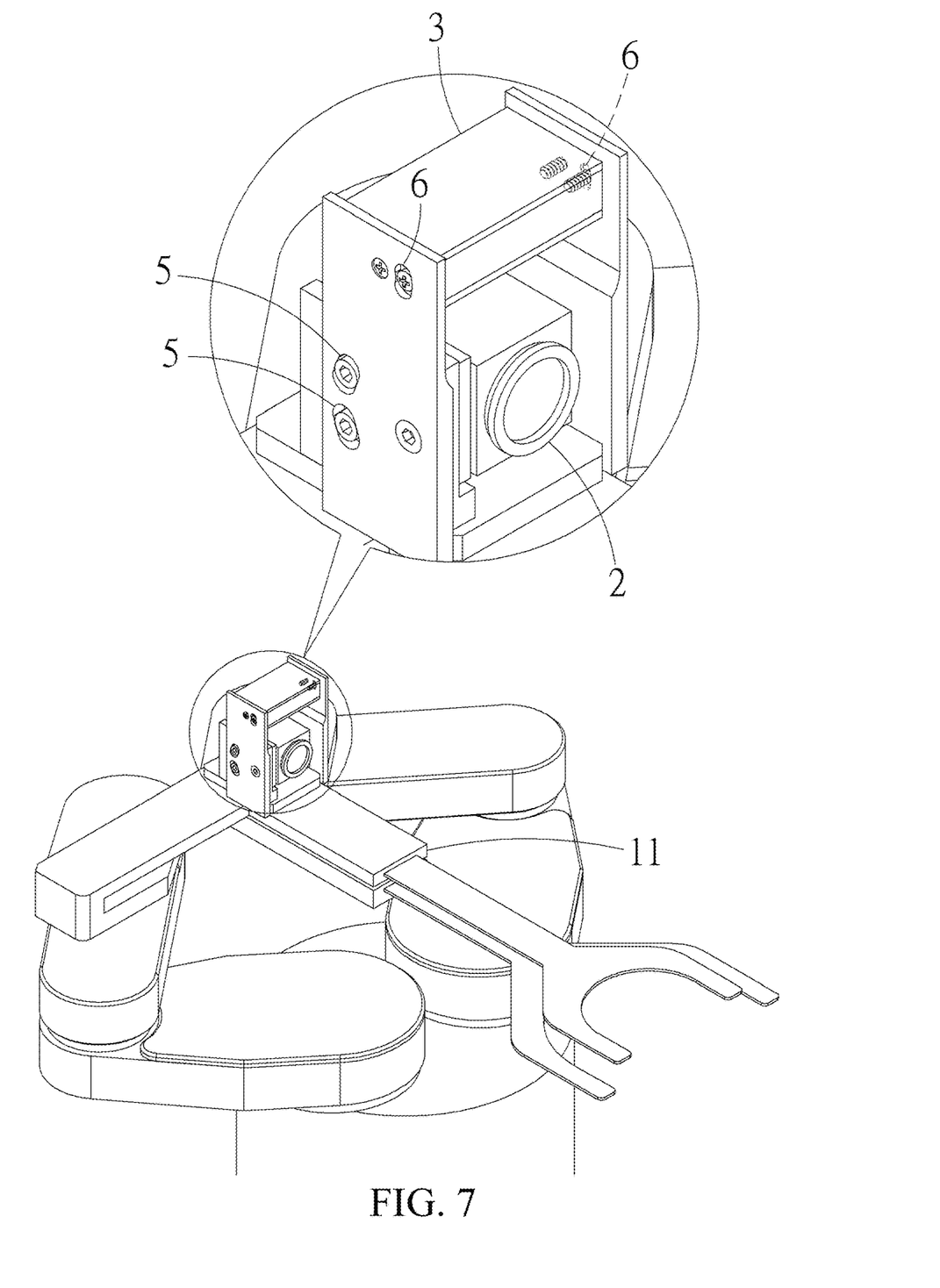
FIG. 7 is a stereoscopic diagram of a third preferred embodiment of the present invention.

Further referring to FIG. 7, which is a stereoscopic diagram of a third preferred embodiment of the present invention, it is clearly seen from the drawing that the instant embodiment, which is generally similar to the previous embodiment, features that the number of each the first angle adjusting member 5 and the second angle adjusting member 6 is increased to two, and the first angle adjusting members 5 are arranged on the same side of the image capture device 2, while the second angle adjusting members 6 are respectively set at two opposite (left and right) sides of the light flashing device 3, in order to increase the fixing strength and to prevent positional deviation of the robotic arm 11 in respect of the angle thereof after an extended period of operation.

Figure 8:
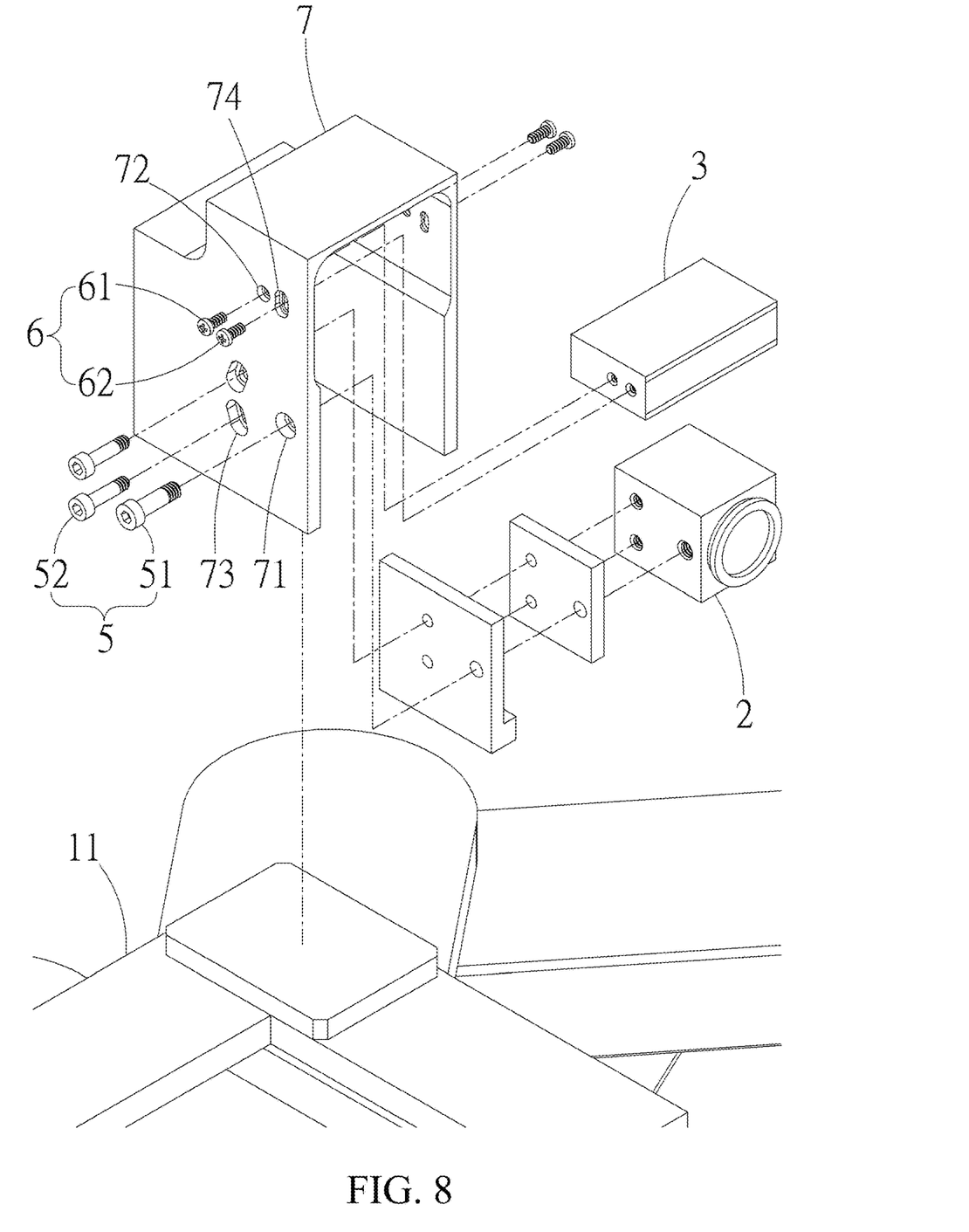
FIG. 8 is an exploded diagram of a fourth preferred embodiment of the present invention.
Figure 9:
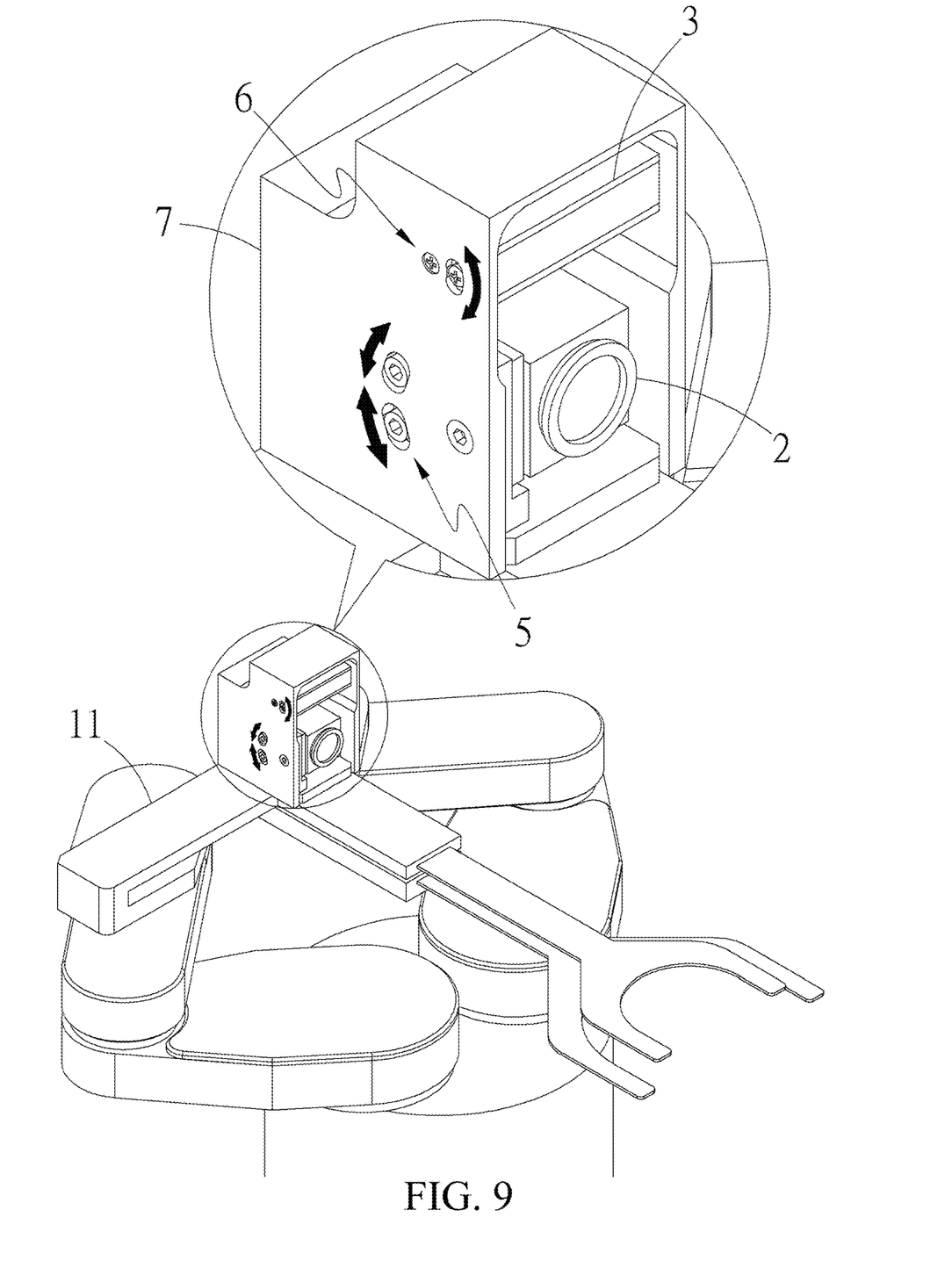
FIG. 9 is a schematic adjustment diagram of the fourth preferred embodiment of the present invention.

Further referring to FIGS. 8 and 9, which are, respectively, an exploded diagram of a fourth preferred embodiment of the present invention and a schematic adjustment diagram of the fourth preferred embodiment of the present invention, it is clearly seen from the drawings that the instant embodiment, which is generally similar to the previous embodiment, features that a protective casing 7 is arranged on the robotic arm 11, and the image capture device 2 and the light flashing device 3 are arranged in an interior space of the protective casing 7, and the protective casing 7 is formed with a first positioning hole 71, a second positioning hole 72, at least one first curved opening 73 arranged at one side of the first positioning hole 71, and at least second curved opening 74 arranged at one side of the second positioning hole 72, wherein the first angle adjusting member 5 is arranged on the protective casing 7 and includes a first oscillation axle 51 fastened to the first positioning hole 71 and at least one first adjusting section 52 fastened to the first curved opening 73, and the second angle adjusting member 6 is arranged on the protective casing 7 and includes a second oscillation axle 61 fastened to the second positioning hole 72 and at least one second adjusting section 62 fastened to the second curved opening 74.

In the arrangement, the first oscillation axle 51 is fastened to the first positioning hole 71 to serve as a positioning axis for the image capture device 2 fixed to the protective casing 7, and the first adjusting section 52 is fastened to the first curved opening 73 to serve as a second fixing point for fixing the image capture device 2 after angle adjustment; and similarly, the second oscillation axle 61 is fastened to the second positioning hole 72 to serve as a positioning axis for the light flashing device 3 fixed to the protective casing 7, and the second adjusting section 62 is fastened to the second curved opening 74 to serve as a second fixing point for fixing the light flashing device 3 after angle adjustment. In other words, the arrangement of the instant embodiment is such that the image capture device 2 is set in the interior of the protective casing 7 by means of the first angle adjusting member 5, and the light flashing device 3 is set in the interior of the protective casing 7 by means of the second angle adjusting member 6, and the protective casing 7 is a metallic enclosure of an inverted U-shape, which after being arranged over the image capture device 2 and the light flashing device 3, can be directly mounted to the robotic arm 11, similarly realizing advantages of simple structure and easy installation. Further, the protective casing 7 provides additional effects of impact protection, dust protection, and aesthetics for the image capture device 2 and the light flashing device 3.

Figure 10:
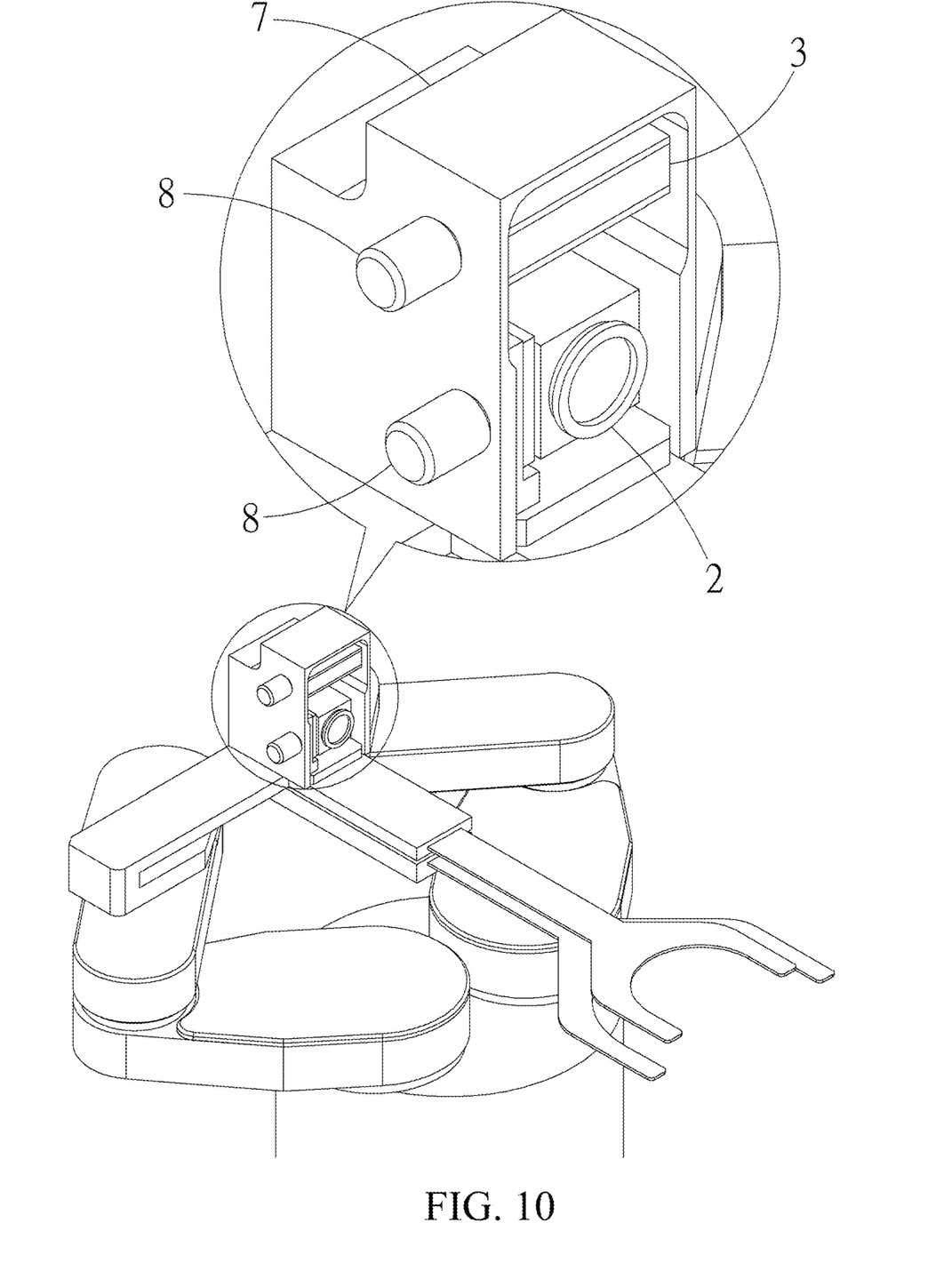
FIG. 10 is a stereoscopic diagram of a fifth preferred embodiment of the present invention.

Further referring to FIG. 10, which is a stereoscopic diagram of a fifth preferred embodiment of the present invention, it is clearly seen from the drawing that the instant embodiment, which is generally similar to the previous embodiment, features that two automatic adjusting elements 8 are provided on the protective casing 7 for respectively adjusting angles of the image capture device 2 and the light flashing device 3. In the instant embodiment, the automatic adjusting elements 8 each comprise a motor, and as such, more accurate control of the angles of the image capture device 2 and the light flashing device 3 can be realized, and further, automatic and accurate adjustment of the angles can be achieved by means of software.

We claim:

1. A wafer position status inspection apparatus, mainly comprising:
    a wafer transportation device;
    a robotic arm, which is rotatably mounted on the wafer transportation device;
    an image capture device, which is arranged on the robotic arm and has an image capturing direction that is consistent with a gripping direction of the robotic arm;
    a light flashing device, which is arranged at one side of the image capture device and has a light projecting direction that is consistent with the image capturing direction, and is operable in such a way as to drive the image capture device to move, so that when light is projected onto a wafer, a light-reflecting contour of the wafer is generated and the image capture device captures a wafer contour image; and
    a status inspection section, which is in information connection with the image capture device, in order to identify a deposition status of the wafer according to the wafer contour image;
    wherein a protective casing is arranged on the robotic arm, and the image capture device and the light flashing device are arranged in an interior space of the protective casing;
    wherein the image capture device comprises at least one first angle adjusting member mounted to the protective casing; and
    wherein the protective casing is formed with a first positioning hole and at least one first curved opening arranged at one side of the first positioning hole, and the first angle adjusting member comprises a first oscillation axle fastened to the first positioning hole and at least one first adjusting section fastened to the first curved opening.

2. The wafer position status inspection apparatus according to claim 1, wherein the light flashing device is provided with at least one second angle adjusting member.

3. The wafer position status inspection apparatus according to claim 1, wherein the protective casing is formed with a second positioning hole and at least one second curved opening arranged at one side of second positioning hole, and the second angle adjusting member comprises a second oscillation axle fastened to the second positioning hole and at least one second adjusting section fastened to the second curved opening.

4. The wafer position status inspection apparatus according to claim 1, wherein two automatic adjusting elements are arranged on the protective casing to respectively adjust angles of the image capture device and the light flashing device.

* * * * *